(12) United States Patent
Smith

(10) Patent No.: US 6,600,521 B1
(45) Date of Patent: Jul. 29, 2003

(54) POWER LOOPTHROUGH

(75) Inventor: Mark Smith, Steeton (GB)

(73) Assignee: Pace Micro Technology PLC, Saltaire (GB)

( * ) Notice: Subject to any disclaimer, the term of this patent is extended or adjusted under 35 U.S.C. 154(b) by 0 days.

(21) Appl. No.: 09/548,162

(22) Filed: Apr. 13, 2000

(30) Foreign Application Priority Data

Apr. 13, 1999 (GB) ............................................. 9908291

(51) Int. Cl.$^7$ ............................ H04N 5/63; H04N 5/775
(52) U.S. Cl. ....................................... 348/730; 348/553
(58) Field of Search .............................. 348/730, 705, 348/706, 553, 552; 725/80, 82, 74; 439/623; H04N 5/63, 5/775

(56) References Cited

U.S. PATENT DOCUMENTS

| | | | | |
|---|---|---|---|---|
| 4,777,503 A | * | 10/1988 | Kramer ....................... | 348/705 |
| 5,255,097 A | * | 10/1993 | Spiero et al. ............... | 348/554 |
| 5,436,618 A | * | 7/1995 | Van Steenbrugge .... | 340/825.25 |
| 5,915,206 A | * | 6/1999 | Diehl et al. ................. | 725/74 |
| 5,991,832 A | * | 11/1999 | Sato et al. .................. | 345/719 |
| 6,212,326 B1 | * | 4/2001 | Dumont et al. ............ | 386/46 |

FOREIGN PATENT DOCUMENTS

| | | | | |
|---|---|---|---|---|
| EP | | 0 843 468 A2 | 11/1997 | .......... H04N/5/775 |

* cited by examiner

*Primary Examiner*—Michael H. Lee
(74) *Attorney, Agent, or Firm*—Head, Johnson & Kachigian

(57) ABSTRACT

The invention relates to the ability to connect items of electrical apparatus and to allow the transfer of data signals between them. In particular, the invention relates to the connection of at least three items of electrical apparatus via scart connections and, the transfer of data signals between the first and third items of apparatus via the second item of apparatus such that even if the second item of apparatus is switched off from its mains power supply, a circuit within the apparatus still be powered via power supply provided via the scart connection to allow the passage of the data signal between the first and third items through the second item. This therefore allows savings in electricity and overcomes the need for the second item of apparatus to be kept connected to a mains power supply at all times which is conventionally the case.

17 Claims, 1 Drawing Sheet

POWER LOOPTHROUGH

CROSS-REFERENCE TO RELATED APPLICATIONS

This application claims priority to British Application No. 9908291.9 filed Apr. 13, 1999.

The current invention which is the subject of this application relates to the ability to power an electrical apparatus to a sufficient extent to allow the passage of data therethrough even when the mains power supply to the apparatus is switched off. In particular, but not necessarily exclusively, the application is directed towards the connection between a broadcast data receiver which is used to receive, and decode data and generate a visual and/or audio display via a display screen such as that of a television or monitor screen, and speakers and further ancillary apparatus such as a video recorder, DVD player or the like.

Typically when a receiver, display screen, and speakers ancillary apparatus are interconnected, connection cables are used, which can have male ends with a series of pins, which are provided for specified functions and insertion into a female socket in the apparatus and/or female ends with a series of apertures for reception of a number of pins from a male socket in the apparatus. These connection cables are sometimes referred to as "scart" leads, or "scart" connections to make the connection between the apparatus. Typically the apparatus is connected so that a data signal from the ancillary apparatus passes through the receiver to the display screen and speakers. In some instances however the receiver may be provided as an integral apparatus with the display screen and speakers. Thus, for a signal to be received for display at the display screen from the ancillary apparatus the signal has first travelled through the receiver. This system works when the receiver has a live mains power supply but when the receiver is switched off and has no mains power supply the data signal cannot pass through or be looped through the receiver and so no signal can be received from the ancillary apparatus at the television. Currently the receiver must remain switched on at all times for the ancillary apparatus data signal and any audio or video display generated therefrom to be viewable at the display screen and heard from the speakers. This can be wasteful of power, if the receiver is itself not required to be used for the generation of the data.

SUMMARY OF THE INVENTION

The aim of the present invention is to provide a means and system whereby the receiver means supply can be off, but the ancillary apparatus data signals can still be routed through the receiver for display at the television.

In a first aspect of the invention there is provided electrical apparatus comprising a display screen and/or speakers connected to receive and display audio and/or video data signals from a receiver of transmitted data and/or an ancillary video and/or audio source connected via the receiver and characterised in that the ancillary video and/or audio source is connected to the receiver by means of a scart lead connection and at least one of the pins of the SCART lead connection is used to carry and supply power to the receiver from the ancillary video and/or audio source to a sufficient extent to allow video and/or audio data signals from the ancillary video and/or audio source to pass through the receiver and on to the display screen and/or speakers.

Typically the power supplied via the scart connection is sufficient to cause the circuitry in the receiver which allows the passage or loopthrough of the data signals to the display screen and/or speakers to be operable even when there is no mains power supply to the receiver and only the ancillary apparatus is powered. The ability to provide sufficient power through the scart connection means that the receiver need not be left switched on or be on standby to allow the passage of the signals and therefore the mains power supply to the receiver can be switched off when the receiver is not in use.

Typically the video and/or audio data from the ancillary source is processed to generate video and/or audio at the display screen and/or speakers by data processing means located downstream of the receiver.

In one embodiment a number of ancillary apparatus can be connected to the receiver and each of the ancillary apparatus is connected to the receiver by a scart connection to allow the same to operate with the supply of power as herein described.

In a second aspect of the invention there is provided at least three items of electrical apparatus at least two of which are connected via a SCART lead connection and wherein passage of data from either of the first or third items of apparatus to the other of the first or third items of apparatus is routed via the second item of apparatus and characterised in that if the second item of apparatus is switched off with no mains power supply, and the first and second items are powered, sufficient power is supplied from the first or third items of apparatus via the scart connection to operate a circuit in the second item of apparatus to allow the passage of the data between the first and third items of apparatus through the second item of apparatus.

Typically the three items of apparatus are connected in series and each are interconnected via a scart lead.

In one embodiment the first item of apparatus is a television, the second item of apparatus is a broadcast data signal receiver and the third item of apparatus is ancillary apparatus such as a video recorder, DVD player or other electrical apparatus.

In one embodiment either of the pins of the scart connection lead which relate to the function switch or RGB status can be used to carry the power supply to the receiver.

In one embodiment the second item of apparatus includes a first circuit which is operable when the said item of apparatus is connected to a mains power supply to allow the loopthrough of the data between the first and third items of apparatus and a second circuit which is activated and operable when the mains power supply is switched off to the second item of apparatus and the first circuit is inactive, and the second circuit derives power via the scart connection from the first or third items of apparatus and allows the loopthrough of the data.

BRIEF DESCRIPTION OF THE DRAWINGS

Specific embodiments of the invention are now described with reference to the accompanying drawing wherein.

DETAILED DESCRIPTION OF THE PREFERRED EMBODIMENT

Figure 1:
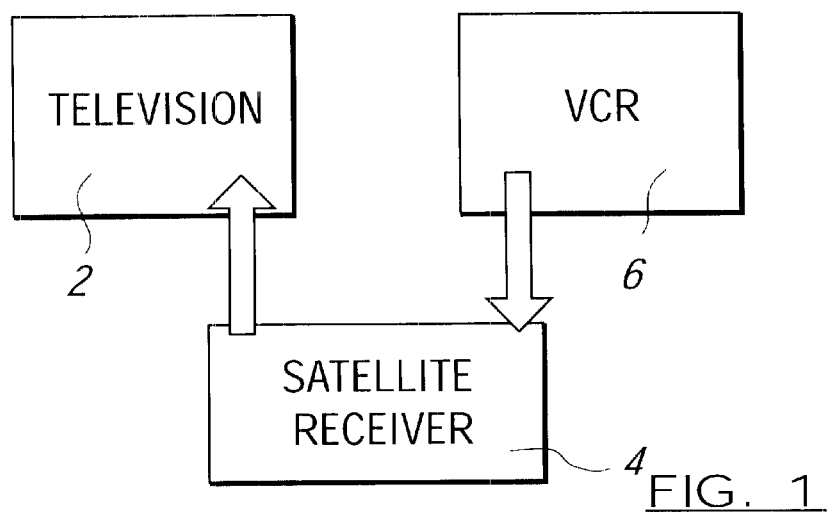
FIG. 1 illustrates a typical connection arrangement between electrical components.

Referring firstly to FIG. 1 there are shown three items of apparatus for which the current invention is particularly useful. The apparatus comprises a television set 2, a broadcast data receiver of transmitted digital data, in this case a satellite signal receiver 4, and ancillary apparatus which, in this case, is shown as a video recorder 6. As shown, the receiver 4 is connected to the television 2 and the video recorder 6 is connected to the receiver 4 via scart lead connections so that data signals from the video recorder pass through the receiver before reaching the television. This passage of the data signal through the receiver is referred to as loopthrough and the receiver includes circuitry and components to allow this to happen when the receiver is powered. The receiver can be deemed to be in operation when it has mains power supplied thereto and the same may be in a fully operational mode whereby the use of control means causes a change in condition of the display, or alternatively may be in standby mode. In whichever case the mains power supply to the receiver is on. However, when the receiver has no power supply it is conventionally the case that the video recorder data signal cannot pass through the receiver as the circuitry and components required within the receiver are unpowered.

Figure 2:
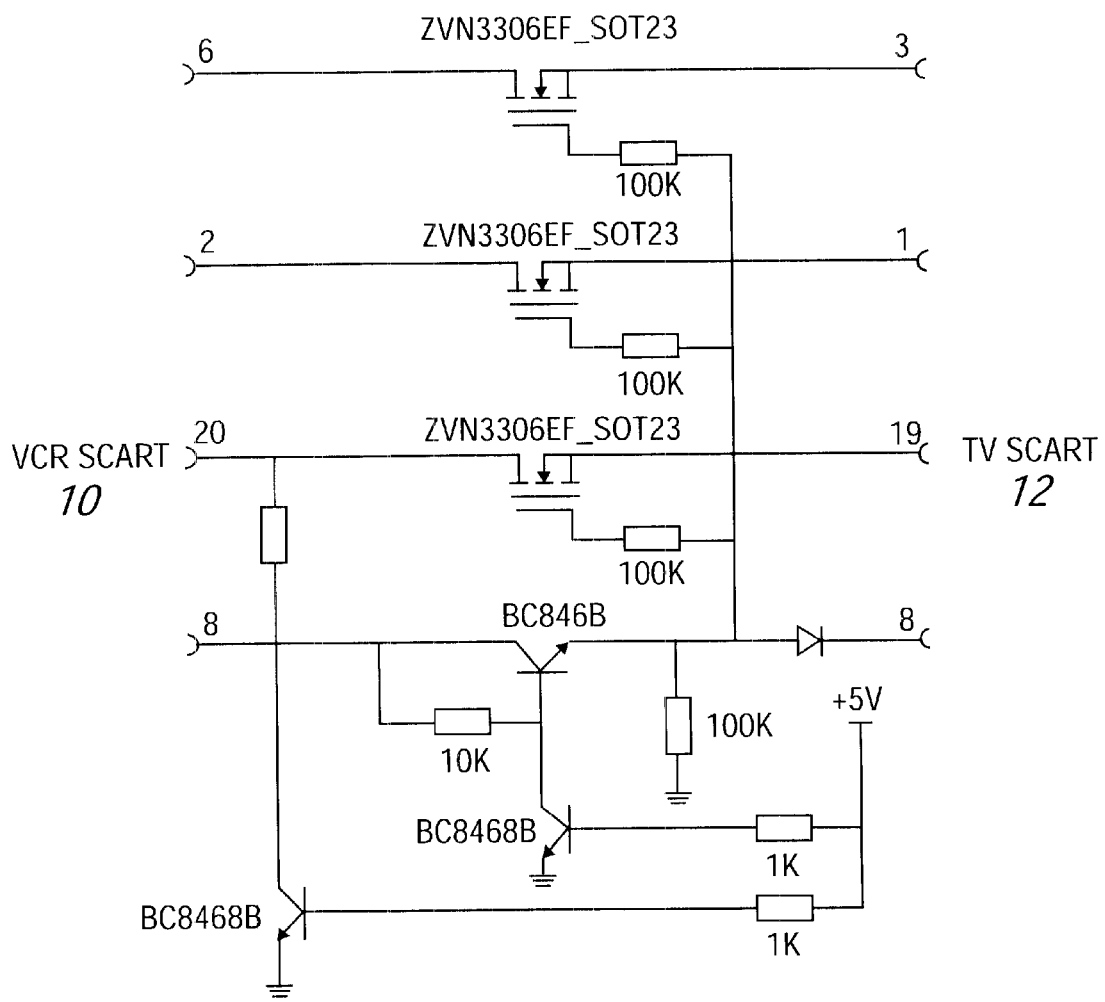
FIG. 2 illustrates an electrical circuit diagram of one implementation of the invention of this application.

FIG. 2 illustrates the manner in which the current invention over comes this loopthrough problem while allowing the mains power supply to the receiver to be switched off. The circuitry is typically provided in the receiver 4 in addition to the standard loopthrough circuitry provided in the receiver. Thus, when the receiver has power supplied thereto, the standard loopthrough circuitry is used but when the power is switched off, the circuit of FIG. 2 can be operational. The circuit preferably utilises solid state devices rather than relays because of several reason such as, relays are noisy and are not reliable, and they require external switching circuits and protection diodes.

FIG. 2 illustrates one embodiment of circuit in accordance with the invention provided within the receiver 4 where the connection for the Video recorder scart connection 10 and television scart connection 12 to the receiver are shown, along with selected Pin numbers 6, 2, 20, 8. Intermediate these connections there are provided several solid state components which are provided so that, in operation, the required operating specifications of the output impedance of the video recorder of 1K and the voltage of 12 volts are met. The termination resistance in the television should also preferably be 10K. In use, if the mains power to the receiver is switched on the circuit shown in FIG. 2 is "transparent" and is not operational. However when the mains power is switched off the circuit is operational when provided with power via at least one of the pins, typically pin 8, of the video recorder scart 10. In use the circuit will consume 110 $\mu$A of current and drop 1.5V and it has been found that the circuit will work with no degradation of video performance down to a termination resistance of 3K3, or an input impedance of 3K3 which equates to a voltage of 8V seen by the television set. Audio data signals at 2Vrms pass through the receiver circuit with no clipping and so audio and video signals can pass through the receiver using the circuit illustrated even when no mains power is supplied to the receiver. Furthermore the passage of the signals is achieved without any significant degradation to the quality of the signal which passes onward to the television for display.

The key benefits of the invention are therefore that the receiver maintains the ability for signal loopthrough to occur even with no mains supply thereto and it is therefore not necessary to have the receiver switched on with mains power supply at all times.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element.

What is claimed is:

1. Electrical apparatus comprising a display screen connected to receive and display video data signals from a broadcast data receiver of transmitted data and from an ancillary video source connected to the receiver and characterised in that the ancillary video source is connected to said broadcast data receiver means by means of a multi-pin scart lead connection, said scart lead used to carry data from the ancillary source to the broadcast data receiver, wherein the ancillary source and broadcast data receiver have separate power sources and characterised in that if the power source to the broadcast data receiver is switched off at least one of the pins of the scart lead connection is used to carry and supply power to the receiver from ancillary video source to a sufficient extent to allow the video data signals from the ancillary video source to pass through the receiver and onto the display screen.

2. Electrical apparatus according to claim 1 wherein said data signals pass through said broadcast data receiver using power supplied from said ancillary video source when said receiver is switched off with no main power supply.

3. Electrical apparatus according to claim 1 wherein power supplied via said scart connection to said receiver is sufficient to cause circuitry to said broadcast data receiver to allow the passage or loopthrough of data signals to said display screen to be rendered operable.

4. Electrical apparatus according to claim 1 characterised in that said video data from said ancillary source is processed to generate video at said display screen by data processing means located downstream of said broadcast data receiver.

5. Electrical apparatus according to claim 1 wherein a plurality of ancillary apparatus is connect to said broadcast data receiver and each of the plurality of ancillary apparatus is connected via a scart connection that provides power to said broadcast data receiver when any one of said ancillary apparatus is powered.

6. Electrical apparatus comprising at least three items of electrical apparatus, at least two of which are connected via a scart lead connection to provide for the transfer of data signals therebetween and the passage of data signals from either of the first or third items of apparatus to the other of the first or third items of apparatus is routed via the second item of apparatus and characterised in that if said second item of apparatus is switched off, with no mains power supply, said first and second items of apparatus are powered, sufficient power is supplied from said first or third items of apparatus via said scart connection to operate a circuit in said second item of apparatus to allow the passage of data signal between said first and third items of apparatus through said second item of apparatus.

7. Electrical apparatus according to claim 6 characterised in that said three items of apparatus are connected in series.

8. Electrical apparatus according to claim 6 characterised in that each of said items of apparatus are interconnected via a scart lead connection.

9. Electrical apparatus according to claim 6 characterised in that said first item of apparatus is a television, said second item of apparatus is a broadcast data signal receiver, and said third item of apparatus is an ancillary apparatus.

10. Electrical apparatus according to claim 9, characterised in that said ancillary apparatus is a video recorder or a DVD player.

11. Electrical apparatus according to claim 6, characterised in that a pin of said scart connection lead which relate to a function switch or RGB status is used to carry said power supply to said receiver.

12. Electrical apparatus according to claim 6 characterised in that said second item of apparatus includes a first circuit which is operable when said second item of apparatus is connected to said mains power supply to allow the loopthrough of said data signals between said first and said third items of apparatus and a second circuit which is activated and operable when said mains power supply to said second item of apparatus is switched off, and a second circuit derives power via said scart connection from one of said first and third item of apparatus and allows the loopthrough of said data signal between said first and said third items of apparatus.

13. Electrical apparatus comprising a speaker connected to receive signals from a broadcast data receiver of transmitted audio signals and from an ancillary audio source connected to the receiver and characterized in that the ancillary audio source is connected to said receiver by means of a multi-pin scart lead connection, said scart lead used to carry data from the ancillary source to the broadcast data receiver, wherein the ancillary source and broadcast data receiver have separate power sources and characterised in that if the power source to the broadcast data receiver is switched off at least one of the pins of the scart lead connection is used to carry and supply power to the receiver from the ancillary audio source to a sufficient extent to allow the audio signals from the ancillary audio source to pass through the broadcast data receiver and onto the speaker.

14. Electrical apparatus according to claim 13 wherein said audio signals pass through said broadcast data receiver using power supplied from said ancillary audio source when said receiver is switched off with no main supply.

15. Electrical apparatus according to claim 13 wherein power supplied via said scart connection to said broadcast data receiver is sufficient to cause circuitry in said broadcast data receiver to allow the passage or loopthrough of audio signals to the speaker to be rendered audible.

16. Electrical apparatus according to claim 13 characterized in that said audio signal from said ancillary source is processed to generate audio by said speaker by means located downstream of said broadcast data receiver.

17. Electrical apparatus according to claim 13 wherein a plurality of ancillary apparatus is connected to said broadcast data receiver and each of the plurality of ancillary apparatus is connected via a scart connection that provides power to said broadcast data receiver when any one of said ancillary apparatus is provided.

* * * * *